United States Patent [19]

Kawamura

[11] Patent Number: 4,553,173
[45] Date of Patent: Nov. 12, 1985

[54] IMAGE PROCESSING APPARATUS
[75] Inventor: Naoto Kawamura, Inagi, Japan
[73] Assignee: Canon Kabushiki Kaisha, Tokyo, Japan
[21] Appl. No.: 451,264
[22] Filed: Dec. 20, 1982
[30] Foreign Application Priority Data Dec. 26, 1981 [JP] Japan ................................ 56-209563

[51] Int. Cl.$^4$ ............................................. H04N 1/40
[52] U.S. Cl. ..................................... 358/283; 358/298
[58] Field of Search ................ 358/280, 282, 283, 298

[56] References Cited
U.S. PATENT DOCUMENTS

4,447,833  5/1984  Sano et al. ........................... 358/298

Primary Examiner—John C. Martin
Assistant Examiner—Edward L. Coles
Attorney, Agent, or Firm—Fitzpatrick, Cella, Harper & Scinto

[57] ABSTRACT

An image processing apparatus such as a laser beam printer or an ink jet printer can reproduce halftone images with a high resolution and a high gradation. Four subelements of an 8×8 matrix picture element which correspond to low gray levels are further divided into small regions. Threshold levels 1 to 4 are set in these regions of each of the divided subelements, respectively. The density of a black dot corresponding to the subelement is changed by pulse width modulation or the like. The reproduced dot pattern has a substantially constant dot pitch.

18 Claims, 15 Drawing Figures

| 57 | 29 | 45 | 61 | 59 | 31 | 47 | 63 |
| 41 | 1  | 5  | 17 | 43 | 3  | 7  | 19 |
| 25 | 13 | 9  | 33 | 27 | 15 | 11 | 35 |
| 53 | 37 | 21 | 49 | 55 | 39 | 23 | 51 |
| 60 | 32 | 48 | 64 | 58 | 30 | 46 | 62 |
| 44 | 4  | 8  | 20 | 42 | 2  | 6  | 18 |
| 28 | 16 | 12 | 36 | 26 | 14 | 10 | 34 |
| 56 | 40 | 24 | 52 | 54 | 38 | 22 | 50 |

| 57 | 29 | 45 | 61 | 59 | 31 | 47 | 63 |
|----|----|----|----|----|----|----|----|
| 41 | 4  | 5  | 17 | 43 | 4  | 7  | 19 |
| 25 | 13 | 9  | 33 | 27 | 15 | 11 | 35 |
| 53 | 37 | 21 | 49 | 55 | 39 | 23 | 51 |
| 60 | 32 | 48 | 64 | 58 | 30 | 46 | 42 |
| 44 | 4  | 8  | 20 | 42 | 4  | 6  | 18 |
| 28 | 16 | 12 | 36 | 26 | 14 | 10 | 34 |
| 56 | 40 | 24 | 52 | 54 | 38 | 22 | 50 |

IMAGE PROCESSING APPARATUS

BACKGROUND OF THE INVENTION

1. Field of the Invention

The present invention relates to an image processing apparatus for recording or displaying an image, such as a laser beam printer or an ink jet printer, which records or displays halftone images with a high resolution and a high gradation.

2. Description of the Prior Art

A scanning system using a rotary polyhedral mirror or an oscillation mirror can provide a great scanning angle and small color dispersion. Such a scanning system is therefore widely used in facsimile systems using lasers, various types of display devices, printers and the like. The system is particularly used as a high-speed scanning device with a rotary polyhedral mirror.

In order to record or display a halftone image with such a scanning system, one picture element on the recording or display surface consists of an $n \times n$ matrix of subelements or an $n \times n$ dot matrix where n is a positive integer. A halftone image is reproduced by printing the respective subelements in black or leaving them blank, that is, by suitably distributing black and white subelements. For example, as shown in FIG. 1, one picture element 1 consists of a $2 \times 2$ matrix consisting of four subelements 2. As shown in FIGS. 1(0) to 1(4), five gray levels of 0 to 4 are obtained by sequentially increasing the number of subelements which are printed in black. In general, $n \times n + 1$ gray levels may be reproduced by constituting a picture element with an $n \times n$ matrix.

The halftone image processing apparatus adopting the method as described above has a number of advantages, described below:

(1) Since recording of the respective subelements may be controlled with digital signals of white or black (binary signals), the system configuration may be simplified.

(2) If a photosensitive body is used, the γ-characteristics of the photosensitive body can be non-linear so that the photosensitive body may be freely selected.

Figure 1:
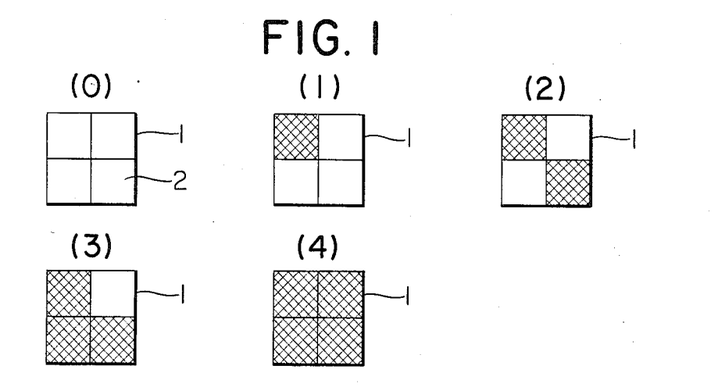
Figure 2:
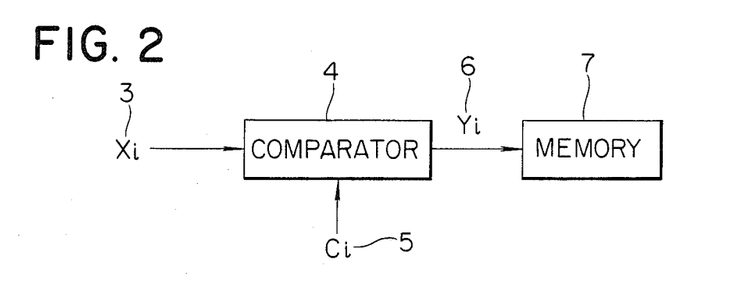
FIG. 2 is a block diagram showing the schematic configuration of an image processing system.
Figure 3:
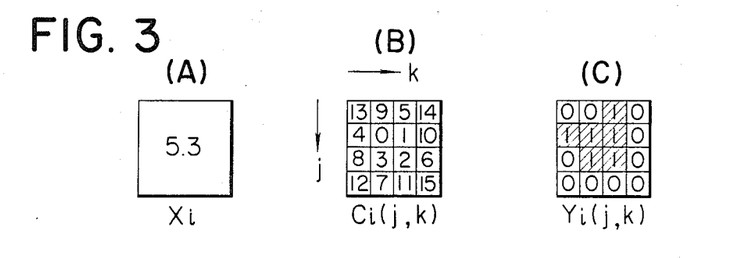
FIGS. 3(A) to 3(C) are representations respectively showing examples of a picture element, a comparison matrix and a dot pattern.

FIG. 2 schematically shows the configuration of an image processing system of the image processing apparatus of the type described above. In this system, an input signal Xi (designated by reference numeral 3) representing the lightness or gray level information at a sampling point i (not shown) of an image is compared with a threshold level Ci (designated by reference numeral 5) by a comparator 4. The comparator 4 produces an output signal Yi (designated by reference numeral 6) in accordance with the comparison result. The threshold level Ci is set by a comparison matrix (threshold matrix) having a $j \times k$ matrix. The input signal Xi shown in FIG. 3(A) is compared with the threshold levels of the subelements of the comparison matrix (threshold matrix). When the input signal Xi exceeds the threshold level, the corresponding subelement is determined to have a black level or logic level "1". By comparing the input signals Xi with the threshold levels, $j \times k$ output signals Yi are produced. A density pattern consisting of a combination of $j \times k$ subelements is obtained by dividing each picture element into $j \times k$ subelements and systematically printing them in black or leaving them blank.

The output signals Yi obtained in this manner are temporarily stored in a memory 7 shown in FIG. 2 and recorded or displayed by an output device. Alternatively, the output signals Yi are directly supplied to the output device for recording or display. For example, as sequentially shown in FIGS. 3(A) to 3(C), assume that the input signal Xi is given as:

$$Xi = 5.3 \times (1/16)$$

and the comparison matrix Ci comprises a $4 \times 4$ matrix of:

$$Ci = (1/16) \times \begin{bmatrix} 13 & 9 & 5 & 14 \\ 4 & 0 & 1 & 10 \\ 8 & 3 & 2 & 6 \\ 12 & 7 & 11 & 15 \end{bmatrix}$$

Assume that the maximum value Ximax of the input signal Xi is 1.0. As a result, the obtainable output signal Yi is given by:

$$Yi = \begin{bmatrix} 0 & 0 & 1 & 0 \\ 1 & 1 & 1 & 0 \\ 0 & 1 & 1 & 0 \\ 0 & 0 & 0 & 0 \end{bmatrix}$$

The comparison results for the respective picture elements of the image are stored in the memory 7.

Figure 4:
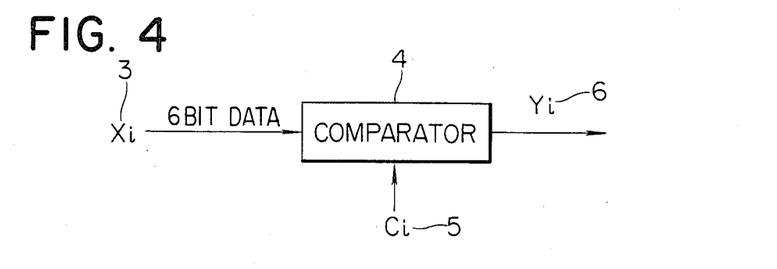
FIG. 4 is a diagram for explaining the mode of operation of the comparator.
Figure 5:
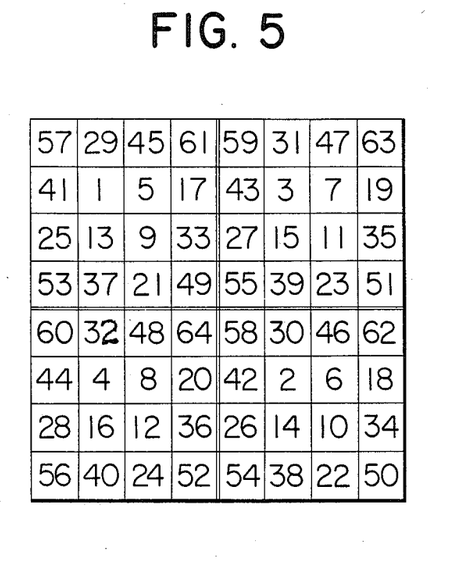
FIG. 5 is a representation of an example of threshold level determination in a conventional comparison matrix.
Figure 6:
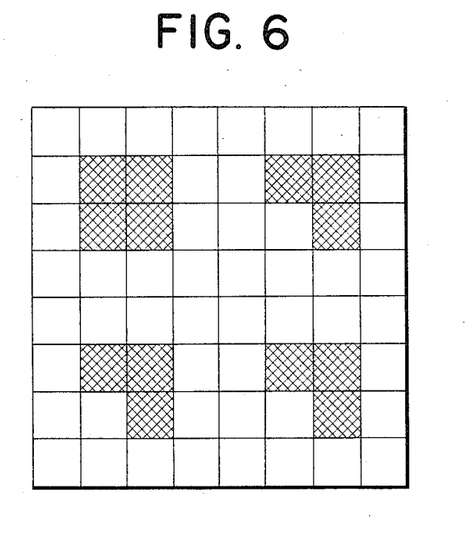
FIG. 6 is a representation showing an example of a dot pattern obtained by the comparison matrix shown in FIG. 5.
Figure 7:
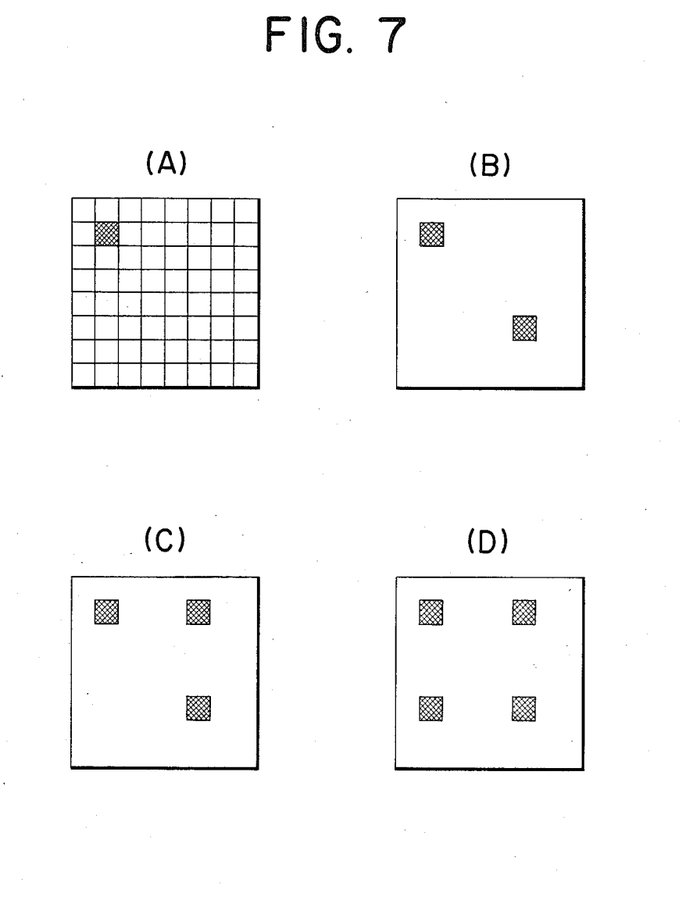
FIGS. 7(A) to 7(D) are representations showing an example of sequential changes in the density of a density pattern.

FIG. 4 shows the mode of operation of the comparator 4 for performing comparison operation as described above. FIG. 5 shows an example of a comparison matrix, and FIG. 6 shows an example of a density pattern obtained.

As may be seen from the respective figures, the input signal Xi is of 6-bit configuration and represents 65 gray levels of 0 to 64. The comparison matrix Ci for comparing and determining the 65 gray levels comprises a $8 \times 8$ matrix. Sixty-four threshold levels 1 to 64 for providing 65 gray levels are set in the respective subelements as shown in FIG. 5. In the comparison matrix as shown in the figure, the $8 \times 8$ matrix consists of four $4 \times 4$ submatrices. If each subelement in which the density level of the picture element exceeds the threshold level is to be printed in black, the black and white pattern of the output signals Yi becomes as shown in FIG. 6 if $Xi = 13$. The resolution of the output image determined by comparison of each of four submatrices with the comparison matrix is thus represented in units of $4 \times 4$ matrices. On the other hand, gradation of the output image is represented in units of $8 \times 8$ matrices each having 4 submatrices. Thus, the resolution and gradation of the output image conveniently correspond to human perception characteristics. According to human perceptual characteristics, high gradation is required for a low spatial frequency region such as the skin of a person. However, in a high spatial frequency region such as an outline of a person, a high resolution is required but not so high a gradation is required. For this reason, better results may be obtained by using a $4 \times 4$ matrix as units for determining resolution and an $8 \times 8$ matrix which allows comparison with a greater number of threshold levels as units for determining gradation.

The relationship between the spatial frequency and the threshold levels of a matrix is described in detail in, for example, application Ser. No. 349,168.

However, in such a method for determining a density level with a subelement matrix, reproducibility is impaired at any image portion where the number of black dots is small. When the density pattern represented by the subelement matrix of a picture element sequentially changes as shown in FIGS. 7(A) to 7(D), the pitch of dots becomes smaller as the number of black dots increases. Thus, the resolution of an image consisting of a combination of such density patterns increases with an increase in the density level of the picture element. More specifically, in the state shown in FIG. 7(A), the pitch of black dots is 8a where a is the size of each subelement. In the state shown in FIG. 7(B), the oblique pitch of the black dots is $4\sqrt{2}a$. In the state shown in FIG. 7(C), pitches of 4a and 8a are involved vertically and horizontally. In the state shown in FIG. 7(D), the pitch of black dots is 4a vertically and horizontally.

If the pitch of black dots changes with an increase in the number of black dots (which, in turn, increases with an increase in the density) in the manner as described above, the density level of the recorded or displayed image does not result in a faithful reproduction of an image in correspondence with the number of black dots. The density level may become denser or lighter than the desired level, or the gradation of the output image may be significantly lowered. Accordingly, with such a change in resolution, the image quality of the output image is significantly degraded and an image of good quality may not be obtained.

SUMMARY OF THE INVENTION

It is an object of the present invention to provide an image processing apparatus which eliminates the problems of the prior art apparatuses and which is capable of producing an output image of good quality.

It is another object of the present invention to provide an image processing apparatus which is capable of recording or displaying a stable halftone image with a high resolution and a high gradation.

It is still another object of the present invention to provide an image processing apparatus which is capable of reproducing a halftone image of excellent quality with a simple configuration.

It is still another object of the present invention to provide an image processing apparatus which may not cause a change in dot pitch of an output image even if the density level changes.

The other objects and features of the present invention will become apparent from the following description taken in conjunction with the accompanying drawings.

BRIEF DESCRIPTION OF THE DRAWINGS

FIGS. 1(0) to 1(4) are representations for explaining a halftone image which is obtained by sequentially printing subelements in black;

FIG. 10 is a perspective view showing an example of an optical system of the laser beam printer;

FIG. 11 is a graph showing characteristic curves of a value of MTF of development and transfer and of an electrostatic latent image as a function of spatial frequency;

FIG. 12 is a representation of an example of a comparison matrix according to the present invention;

FIGS. 13(A) to 13(D) are representations showing sequential changes in the density pattern according to the present invention;

FIG. 14 is a block diagram showing the schematic configuration of an image processing apparatus according to the present invention.

DETAILED DESCRIPTION OF THE PREFERRED EMBODIMENT

The preferred embodiment of the present invention will now be described with reference to the accompanying drawings.

Figure 8:
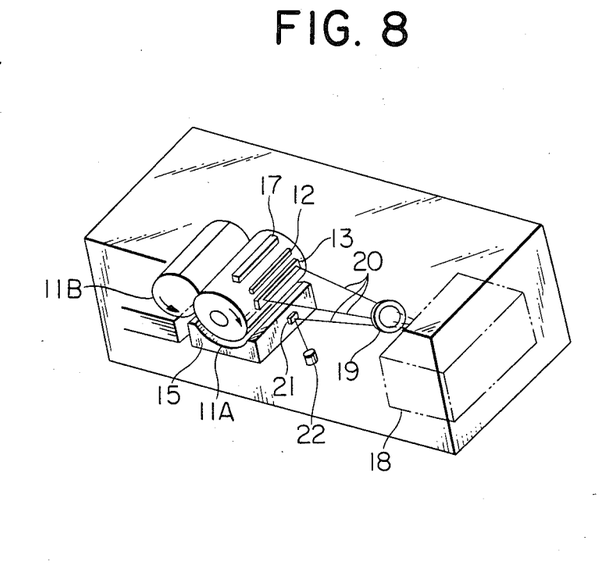
FIGS. 8 and 9 are a perspective view and a side view showing a laser beam printer, respectively.
Figure 9:
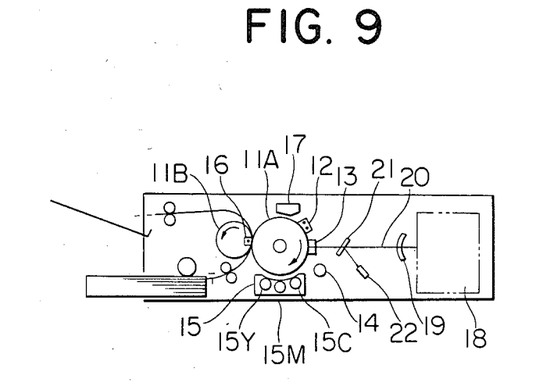

An example of a laser beam printer will be described with reference to FIGS. 8 to 10 as an image recording apparatus suitable for an image processing apparatus of the present invention. Referring to FIGS. 8 and 9, a photosensitive drum 11A and a transfer drum 11B rotate in the directions indicated by arrows, respectively. Around the photosensitive drum 11A are arranged, in the order named and along the direction of its rotation, a primary charger 12, an exposure charger 13, a whole surface exposing unit 14, a developing unit 15, a transfer charger 16 and a cleaner 17. The optical system shown in FIG. 10 includes a light beam scanner 18 extending up to a focusing lens 19.

Figure 10:
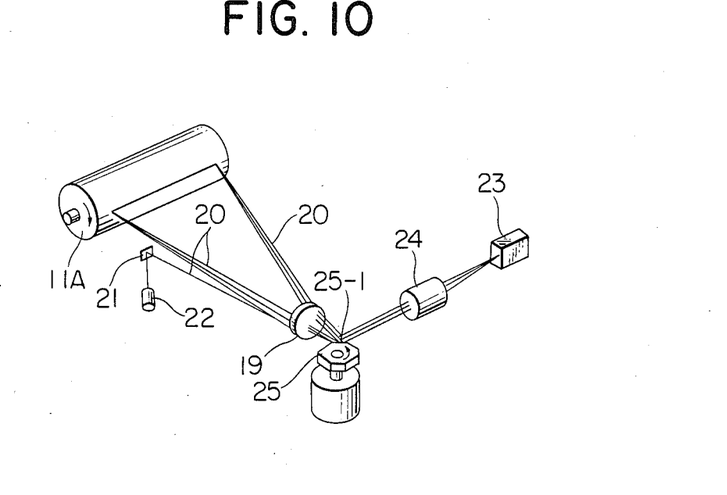

In the optical system shown in FIG. 10, light beams 20 emitted by a semiconductor laser 23 are converted into parallel light beams by a collimator lens 24 and become incident on a rotary polyhedral mirror 25 rotating at high speed. After being reflected by a reflecting mirror surface 25-1 of the rotary polyhedral mirror 25, the parallel light beams 20 form an image on the photosensitive drum 11A through the focusing lens 19 as an image forming means. Main scanning is performed in accordance with changes in the reflection angle of the reflecting mirror surface 25-1 as the rotary polyhedral mirror 25 rotates. Subscanning is performed by rotation of the photosensitive drum 11A. In such a state, an input image signal is supplied to the semiconductor laser 23 so as to form an image on the photosensitive drum 11A with the laser beams of intensities varying in accordance with the input image signal. In order to generate horizontal sync signals for registering the start positions of the respective main scanning operations, when the laser beams pass slightly outside the main scanning start positions of the laser beams, the laser beams are guided to a photodetector 22 through a mirror 21. The horizontal sync signals are generated in response to reception of the laser beams. Supply of the input image signal to the semiconductor laser 23 is initiated at the main scanning start point, which is after a predetermined time interval from the generation of the horizontal sync signals.

In the laser beam printer of the configuration as shown in FIGS. 8 and 9, a DC corona discharge is caused between the primary charger 12 and the surface of the rotating photosensitive drum 11A so as to uniformly charge positively or negatively the photosensitive body of the photosensitive drum 11A. The exposure charger 13 generates an AC or DC corona discharge of the opposite polarity to the primary charging in the photosensitive body. At the same time, the light beams main-scanned by the rotary polyhedral mirror 25 are radiated onto the surface of the photosensitive drum 11A to form an electrostatic latent image thereon. The electrostatic latent image on the surface of the photosensitive body is uniformly illuminated with light from the entire surface exposing unit 14 such as a fluorescent lamp. Then, the surface potential difference is increased between the portions of the photosensitive body which are radiated with the recording laser beams and which are not. Thus, an electrostatic latent image of high contrast is formed on the surface of the photosensitive drum 11A.

The electrostatic latent image of high contrast thus obtained is visualized by the developing unit 15. Development is preferably performed by the magnetic brush method or the fur brush method. The toner image thus obtained is electrostatically transferred onto a recording paper sheet wound on the transfer drum 11B by the transfer charger 16. The developing unit 15 consists of three units 15Y, 15M and 15C corresponding to yellow (Y), magenta (M), and cyan (C), respectively. One color image is transferred on the recording paper sheet on the transfer drum 11B by three development operations, that is, three revolutions of the photosensitive drum 11B. The residual toner on the photosensitive drum 11A after transfer of the toner image therefrom is cleaned with the roller of the cleaner 17.

Figure 11:
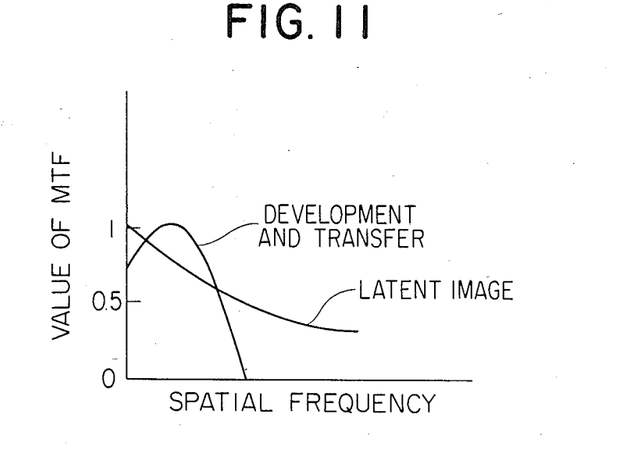

FIG. 11 shows the characteristic curves of the value of MTF of development and transfer and of the electrostatic latent image as a function of spatial frequency in the electrographic technique as described above. In the graph of FIG. 11, the spatial frequency of an image corresponding to the frequency of the input image signal is plotted along the axis of abscissa, while the value of MTF (Modulation Transfer Function) is plotted along the axis of ordinate. As may be seen from the graph, the value of MTF sharply decreases with an increase in the spatial frequency. When a dot pattern for each picture element is recorded using a comparison matrix as shown in FIG. 5 in the manner as described above, the basic spatial frequency changes significantly with changes in the number of black dots in a region of low density, that is, in a region of a small number of black dots, as described with reference to FIG. 7. Therefore, an output image does not have a desired quality and recording density. Thus, it is seen that the basic spatial frequency, that is, the pitch of the black dots is preferably kept constant.

Figure 12:
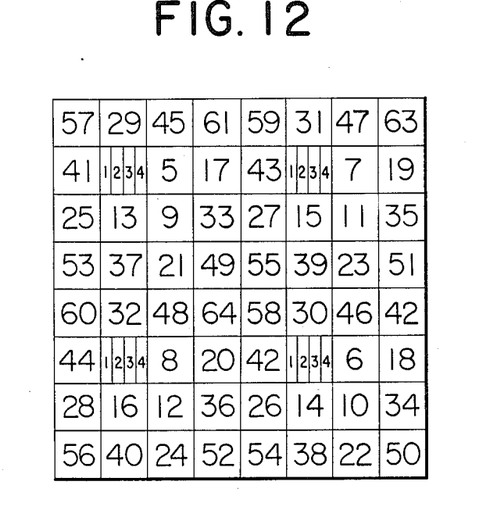
Figure 13:
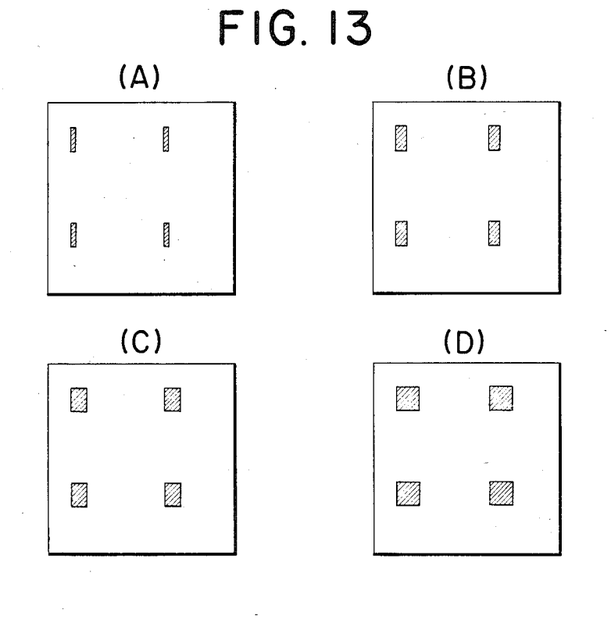

FIG. 12 shows an example of a comparison matrix (threshold matrix) for forming a dot pattern of a constant basic spatial frequency. The arrangement of threshold levels in the comparison matrix is substantially the same as that in the conventional comparison matrix shown in FIG. 5. However, in the subelements of the threshold levels 1 to 4, each subelement is subdivided into four regions; four threshold levels 1 to 4 are set in the four regions. The density of the black dot is changed by the pulse width modulation or the like. When the comparison matrix of the present invention as shown in FIG. 12 is used, an image of a dot pattern having a substantially constant pitch may be obtained.

FIGS. 13(A) to 13(D) show examples of the output images of the dot patterns of a constant pitch. As may be seen from a comparison of the output images in FIGS. 13(A) to 13(D) with those in FIGS. 7(A) to 7(D), the pitch of the basic lattice (pitch of dots) of the dot pattern is constant. Thus, the problem of the conventional apparatus wherein the non-proportionality of resolution and gradation of an output image to the changes in the density of the image is solved.

Figure 14:
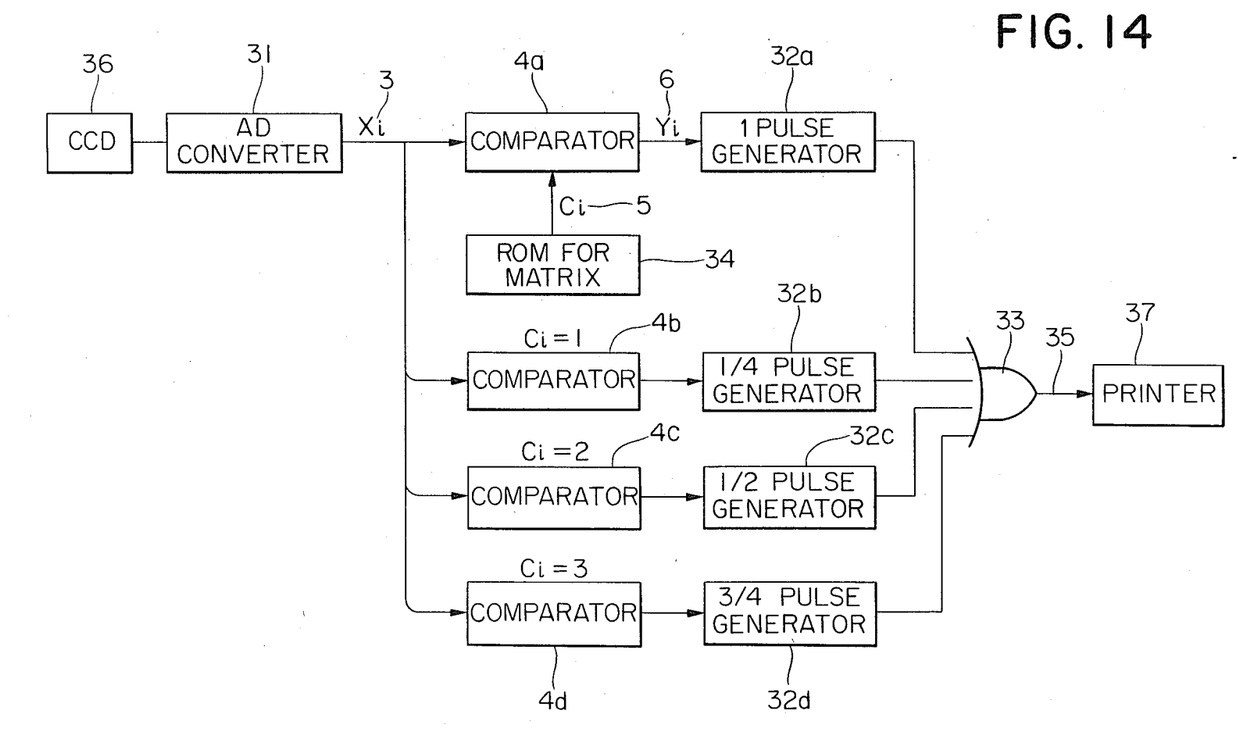
Figure 15:
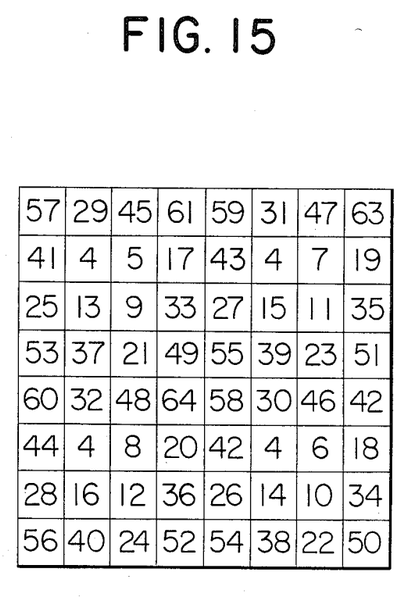
FIG. 15 is a representation showing another example of a comparison matrix according to the present invention.

FIG. 14 shows an example of an output image signal generation circuit for obtaining the output images as described above. In the circuit shown in FIG. 14, an image on an original is read by a solid state element 36 such as a CCD and the obtained analog video signal is supplied to an analog/digital (A/D) converter 31. The A/D converter 31 quantizes the input analog video signal into a 6-bit (64 levels) signal. A 6-bit input digital image signal $Xi$ from the A/D converter 31 is supplied to comparators 4a to 4c in parallel with each other. The comparator 4a compares the input digital image signal $Xi$ with a threshold level $Ci$ read out from a read-only memory (ROM) 34 storing the comparison matrix as described above. If $Xi > Ci$, the comparator 4a produces an output digital image signal $Yi = 1$ so as to allow a 1 pulse signal of the pulse width corresponding to one subelement to be generated by a one-pulse generator 32a. As shown in FIG. 15, threshold levels of 4 or higher are set in the comparison matrix stored in the ROM 34. Therefore, if the input image signal $Xi$ corresponds to one of the threshold levels 1, 2 and 3, the output digital image signal $Yi = 1$ is not obtained.

The comparators 4b, 4c and 4d respectively store comparison levels wherein the threshold levels $Ci$ are set at 1, 2 and 3. A ¼ pulse generator 32b, a 2/4 pulse generator 32c, and a ¾ pulse generator 32d are connected to the comparators 4b, 4c and 4d, respectively. When the input image signals $Xi$ are 1, 2 and 3, respectively, the ¼ pulse generator 32b, the 2/4 pulse generator 32c and the ¾ pulse generator 32d respectively generate a ¼ pulse signal having a ¼ pulse width, a 2/4 pulse signal having a 2/4 pulse width, and a ¾ pulse signal having a ¾ pulse width, for one subelement. These pulse signals from the ¼ pulse generator 32b, the 2/4 pulse generator 32c, and the ¾ pulse generator 32d are supplied to a multiple-input OR circuit 33 which also receives the 1 pulse signal and which produces an output image signal.

When the input image signal $Xi$ is 1, the comparator 4b detects it and allows the ¼ pulse generator 32b to generate a ¼ pulse signal. The ¼ pulse signal is supplied to a printer 37 as shown in FIGS. 8 to 10 through the OR circuit 33 and an output image as shown in FIG. 13(A) is obtained. Similarly, when the input image signals $Xi$ are 2, 3 and 4, the output images as shown in FIGS. 13(B) to 13(D) are obtained.

Pulse width modulation is performed in accordance with the input image signals in this manner. Output images of dot patterns of a substantially constant pitch are obtained by changing the width (density) of the dots.

In this embodiment, the input image signal $Xi$ is supplied to the four comparators in parallel with each other to obtain output images in a hardware manner. However, image processing may be performed in a software manner using a 1-chip microcomputer.

The 1-chip microcomputer may perform comparison of the input image signal Xi with the threshold level so as to allow pulse width modulation in accordance with the comparison result.

In the embodiment described above, one input image signal Xi (picture element) is compared with all the threshold levels of, for example, an 8×8 matrix to obtain a density pattern. However, according to the present invention, an output image may be obtained by the image processing method (dither method) wherein one input image signal is compared with one threshold level.

An output image may also be obtained by comparing one input image signal with a plurality of threshold levels of a matrix.

In the embodiment described above, the input image signals and the threshold levels of the threshold matrix are compared to obtain an output image. However, an input image signal may be used as an address of a ROM so as to obtain an output image (reproduction signal) from the ROM by accessing it based on this address.

In summary, according to the present invention, an output image of high quality may be recorded or displayed with a high resolution and a high gradation. The present invention may be conveniently applied to an ink jet printer. This is because, when an image is recorded by ink jet, the density level of the image recorded abruptly changes when a shift is made from a portion of the lowest density level (i.e., white) to a next portion.

In order to solve such a problem, the pulse width or the amplitude of the voltage to be applied to the head of the ink jet printer may be changed. As a result, the image may be reproduced satisfactorily even if the density level is low.

The present invention is not limited to the particular embodiment described above. Various other changes and modifications may be made within the spirit and scope of the present invention.

What I claim is:

1. An image processing apparatus comprising:
   A/D converting means for A/D converting an input analog image signal;
   threshold level signal generating means for generating a threshold level signal; and
   output means for outputting a reproduction signal from an image signal from said A/D converting means and the threshold level signal, said output means having controlling means for controlling the reproduction signal so that a dot pitch of an image recorded or displayed in accordance with the reproduction signal is substantially constant; wherein said controlling means controls the reproduction signal in accordance with the image signal and the threshold level signal generated by said threshold level signal generating means; and wherein said controlling means has pulse width mdoulating means for changing a pulse width of the reproduction signal in accordance with the threshold level signal.

2. An image processing apparatus comprising:
   A/D converting means for A/D converting an analog image signal;
   threshold level signal generating means for generating a threshold level signal, said threshold level signal generating means generating a plurality of threshold level signals for one image signal from said A/D converting means; and
   output means for outputting a reproduction signal selected and controlled in accordance with the image signal from said A/D converting means and the plurality of threshold level signals which are supplied in parallel with each other; wherein said output means has controlling means for selecting and controlling the reproduction signal so that a dot pitch of an image recorded or displayed in accordance with the reproduction signal is substantially constant; and wherein said controlling means has pulse width modulating means for changing a pulse width of the reproduction signal in accordance with the threshold level signal.

3. An image processing apparatus comprising:
   input means for entering image data;
   means for processing the image data from said input means and for outputting a reproduction signal representing a dot image pattern,
   said processing/outputting means processing the entered image data so that a dot pitch of an output image is substantially constant in an area having a predetermined density.

4. An image processing apparatus according to claim 3, wherein said processing/outputting means processes the entered image data by utilizing a predetermined threshold matrix and outputs the reproduction signal.

5. An image processing apparatus according to claim 3, wherein said input means includes means for A/D converting entered analog image data.

6. An image processing apparatus according to claim 3, wherein said processing/outputting means processes the entered image data so that a dot pitch of an output image is substantially constant in an area having a low density.

7. An image processing apparatus according to claim 3, wherein said processing/outputting means is adapted to change a dot size of a dot image pattern to be output.

8. An image processing apparatus according to claim 7, wherein said processing/outputting means includes means for modulating a pulse-width of the reproduction signal so as to change a dot size of a dot image pattern to be output.

9. An image processing apparatus according to claim 4, wherein said processing/outputting means includes means for generating a threshold level signal, and means for comparing the entered image data with the threshold level signal and for outputting the reproduction signal.

10. An image processing apparatus comprising:
    input means for receiving an image signal;
    processing means for processing the image signal received by said input means so as to generate a reproduction signal; and
    output means for outputting the reproduction signal, said processing means producing the reproduction signal so that an image recorded or displayed by said output means has a dot pattern of a substantially constant pitch; wherein said processing means controls the reproduction signal so as to change a density of dots in the dot pattern; and wherein said processing means has pulse modulating means for changing a pulse width of the reproduction signal.

11. An image processing apparatus comprising:
    input means for receiving an image signal;
    reproduction signal generating means for generating a reproduction signal in accordance with a level of the image signal received by said input means; and output means for outputting the reproduction signal, said reproduction signal generating means controlling the reproduction signal so that a dot density of an image recorded or displayed by said output means is variable when the level of the image signal is within a predetermined range, and controlling the reproduction signal in accordance with the level of the image signal when the level of the image signal is within the predetermined range; and wherein said reproduction signal generating means has pulse width modulating means for changing a pulse width of the reproduction signal.

12. An image processing apparatus comprising:

A/D converting means for A/D converting an input analog image signal;

threshold level signal generating means for generating a threshold level signal; and output means for outputting a reproduction signal from an image signal from said A/D converting means and the threshold level signal, said output means having controlling means for controlling the reproduction signal so that a dot pitch of an image recorded or displayed in accordance with the reproduction signal is substantially constant; wherein said controlling means controls the reproduction signal in accordance with the image signal and the threshold level signal generated by said threshold level signal generating means; wherein said output means has comparing means for comparing the image signal with the threshold level signal; and wherein said controlling means has pulse width modulating means for changing a pulse width of the reproduction signal in accordance with the threshold level signal.

13. An image processing apparatus comprising:

input means for receiving an image signal; reproduction signal generating means for generating a reproduction signal in accordance with a level of the image signal received by said input means; and output means for outputting the reproduction signal, said reproduction signal generating means controlling the reproduction signal so that a dot density of an image recorded or displayed by said output means is variable when the level of the image signal is within a predetermined range, and controlling the production signal generating means controls the reproduction signal in accordance with the level of the image signal when the level of the image signal is within the predetermined range; wherein said reproduction signal generating means generates the reproduction signal so that the image recorded or displayed by said output means has a dot pattern of a substantially constant pitch; and wherein said reproduction signal generating means has pulse width modulating means for changing a pulse width of the reproduction signal.

14. An image processing apparatus comprising:

means for entering image data; and means for processing the image data entered via said entry means by utilizing a predetermined threshold matrix to produce a reproduction signal representing a dot image pattern, and for outputting the reproduction signal, said processing/outputting means including means for modulating a pulse-width of the reproduction signal so as to change a dot size of a dot image pattern to be output.

15. An image processing apparatus according to claim 16, wherein said processing/outputting means processes the entered image data so that a dot pitch of an output image is substantially constant at least on a low density area.

16. An image processing apparatus according to claim 16, wherein said processing/outputting means includes means for generating a threshold level signal, and means for comparing the entered image data with the threshold level signal and for outputting the reproduction signal.

17. An image processing apparatus according to claim 16, wherein said entry means includes means for A/D converting entered analog image data.

18. An image processing apparatus according to claim 18, wherein said threshold level signal generating means generates a plurality of threshold level signals with respect to one entered image datum.

* * * * *

UNITED STATES PATENT AND TRADEMARK OFFICE
CERTIFICATE OF CORRECTION

PATENT NO. : 4,553,173

DATED : November 12, 1985

INVENTOR(S) : NAOTO KAWAMURA

It is certified that error appears in the above-identified patent and that said Letters Patent is hereby corrected as shown below:

Col. 2, line 37, change "8x8" to --an 8x8--.

Col. 4, lines 37-8, change "a whole/surface" to --a whole-surface--.

Col. 7, line 57, change "mdoulating" to --modulating--.

Col. 10, lines 25-6, change "according to/claim 16," to --according to claim 14,--.

Col. 10, lines 30-1 change "according to/claim 16," to --according to/claim 14,--.

Col. 10, lines 36-7, change "according to/claim 16," to --according to/claim 14,--.

Col. 10, lines 39-40, change "according to/claim 18," to --according to/claim 16,--.

Signed and Sealed this

Twenty-eighth Day of October, 1986

[SEAL]

Attest:

DONALD J. QUIGG

Attesting Officer     Commissioner of Patents and Trademarks